United States Patent
Briggs et al.

(10) Patent No.: US 11,348,060 B2
(45) Date of Patent: May 31, 2022

(54) INCREASING COST BENEFIT AND ENERGY EFFICIENCY WITH MODULAR DELIVERY DRONES IN INCLEMENT WEATHER

(71) Applicant: International Business Machines Corporation, Armonk, NY (US)

(72) Inventors: Benjamin D. Briggs, Waterford, NY (US); Leigh Anne H. Clevenger, Rhinebeck, NY (US); Aldis Sipolins, New York City, NY (US); Michael Rizzolo, Albany, NY (US); Lawrence A. Clevenger, Saratoga Springs, NY (US); Christopher J. Penny, Saratoga Springs, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 496 days.

(21) Appl. No.: 16/111,803

(22) Filed: Aug. 24, 2018

(65) Prior Publication Data
US 2020/0065762 A1 Feb. 27, 2020

(51) Int. Cl.
*G06Q 10/08* (2012.01)
*B64C 39/02* (2006.01)
*G08G 5/00* (2006.01)
*G07C 5/08* (2006.01)

(52) U.S. Cl.
CPC ...... *G06Q 10/08345* (2013.01); *B64C 39/024* (2013.01); *G06Q 10/08355* (2013.01); *G07C 5/0808* (2013.01); *G08G 5/0034* (2013.01); *G08G 5/0069* (2013.01); *G08G 5/0091* (2013.01); *B64C 2201/128* (2013.01)

(58) Field of Classification Search
CPC ....... G06Q 10/08345; G06Q 10/08355; G08G 5/0091
See application file for complete search history.

(56) References Cited

U.S. PATENT DOCUMENTS

| | | | |
|---|---|---|---|
| 9,348,333 B1* | 5/2016 | Buchmueller | G05D 1/0011 |
| 10,872,304 B1* | 12/2020 | Eisenmann | B64C 39/024 |
| 2016/0335898 A1 | 11/2016 | Caplan et al. | |
| 2017/0233073 A1* | 8/2017 | Ao | B64C 39/024 454/184 |
| 2017/0327224 A1* | 11/2017 | Phan | G08G 5/0056 |
| 2018/0016027 A1* | 1/2018 | Cheatham, III | G06Q 10/0832 |
| 2018/0074518 A1* | 3/2018 | Cantrell | G05D 1/102 |

OTHER PUBLICATIONS

Scott, Judy; Scott, Carlton "Drone Delivery Models for Healthcare", Jan. 4, 2017, Hawaii International Conference on System Sciences, pp. 3297-3304. (Year: 2017).*

* cited by examiner

*Primary Examiner* — George Chen
*Assistant Examiner* — Wayne S. Murray
(74) *Attorney, Agent, or Firm* — Cantor Colburn LLP; Teddi Maranzano (57) ABSTRACT

Aspects include a system, method and computer program product for delivering a package via an unmanned aerial vehicle (UAV). A delivery parameter for delivering the package via the UAV is obtained. A weather parameter related to the delivery parameter is obtained. A flight configured for the UAV is selected, wherein the selected flight configuration reduces a delivery cost of the package via the UAV based on the weather parameter and the delivery parameter. The package is delivered using the selected flight configuration of the UAV.

11 Claims, 5 Drawing Sheets

INCREASING COST BENEFIT AND ENERGY EFFICIENCY WITH MODULAR DELIVERY DRONES IN INCLEMENT WEATHER

BACKGROUND

The present invention relates generally to delivery of packages using unmanned aerial vehicles (UAV) such as drones and, more specifically, to selecting a flight configuration for a UAV that decreases costs based on weather and other flight conditions for the UAV.

There has been increasing interest in using drones to deliver packages for commercial purposes. Weather patterns, however, tend to impede the cost effectiveness of using drones over other methods of package delivery. Therefore there is a need to determine flight configurations for drone delivery that reduces cost inefficiencies brought on by weather patterns.

SUMMARY

Embodiments of the present invention are directed to a method for delivering a package via an unmanned aerial vehicle (UAV). A non-limiting example of the method includes obtaining a delivery parameter for delivering the package via the UAV, obtaining a weather parameter related to the delivery parameter, selecting, via a processor, a flight configuration of the UAV that reduces a delivery cost of the package via the UAV based on the weather parameter and the delivery parameter, and delivering the package using the selected flight configuration of the UAV.

Embodiments of the present invention are directed to a system for package delivery. A non-limiting example of the system includes a memory having computer readable instructions, and one or more processors for executing the computer readable instructions. The computer readable instructions include instructions for obtaining a delivery parameter for delivering the package via an unmanned aerial vehicle (UAV), obtaining a weather parameter related to the delivery parameter, selecting, via a processor, a flight configuration of the UAV that reduces a delivery cost of the package via the UAV based on the weather parameter and the delivery parameter; and delivering the package using the selected flight configuration of the UAV.

Embodiments of the present invention are directed to a computer program product for delivery of a package. The computer program product includes a computer readable storage medium having program instructions embodied therewith. The program instructions are executable by a processor to cause the processor to perform: obtaining a delivery parameter for delivering the package via an unmanned aerial vehicle (UAV), obtaining a weather parameter related to the delivery parameter, and selecting, via a processor, a flight configuration of the UAV that reduces a delivery cost of the package via the UAV based on the weather parameter and the delivery parameter.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
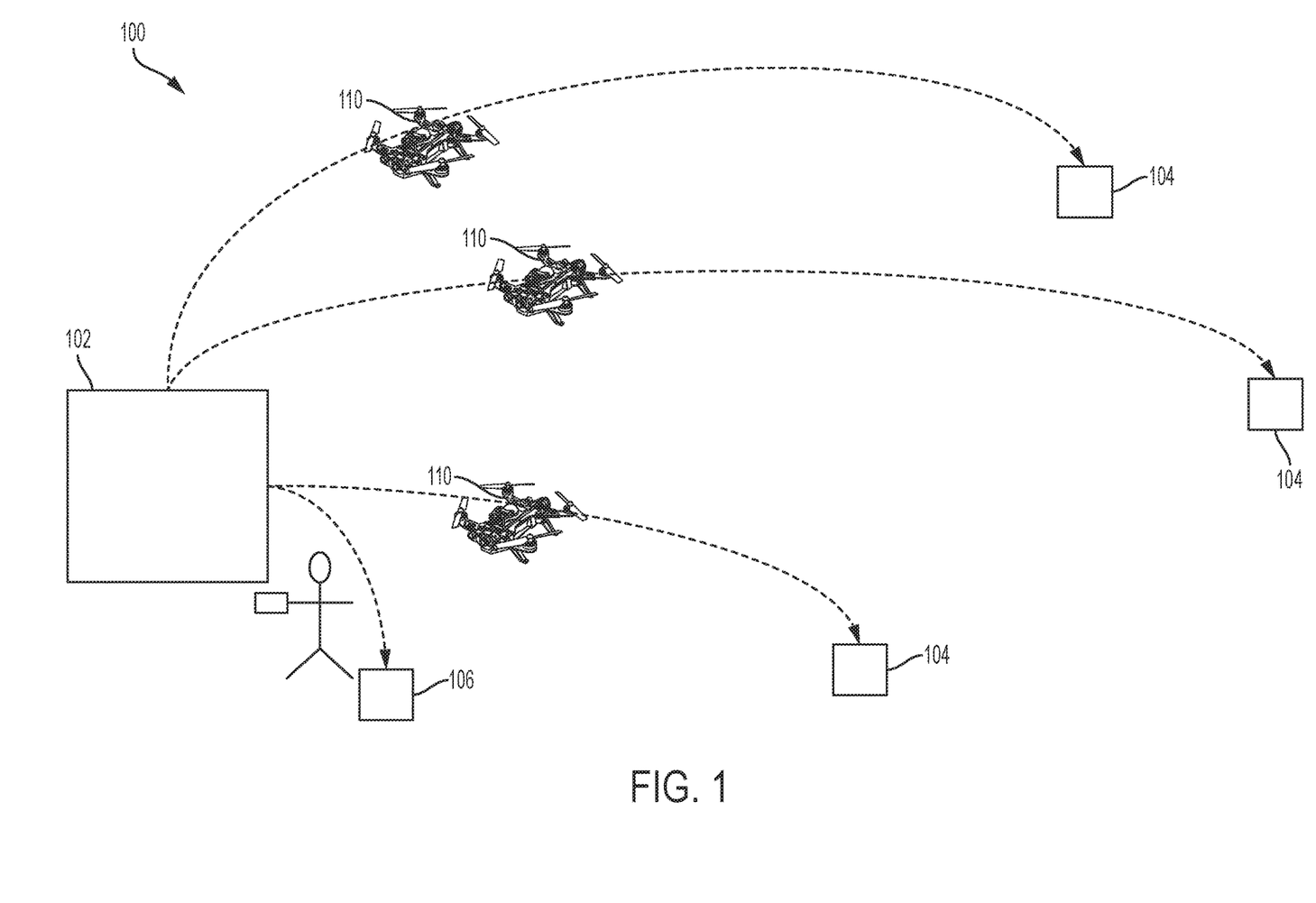
FIG. 1 depicts a diagram of a package delivery system in accordance with some embodiments of this disclosure.

Turning now to FIG. 1, a package delivery system 100 is generally shown in accordance with an embodiment. The package delivery system 100 employs unmanned aerial vehicle (UAV) for package delivery purposes in accordance with an embodiment. The system 100 includes a source location 102 such as a warehouse, store or delivery vehicle, etc., from which a package is to be sent. The system 100 provides package delivery to package destinations 104, 106. Some package destinations 104 are at a distance from the source location 102 thus making it cost effective to deliver the package by UAVs 110. Other package destinations 106 are close enough to the source location 102 that hand delivery or ground transportation serves as the most cost effective method for package delivery.

The UAVs 110 used for package delivery can be selected in order to suit a particular package delivery parameter. For example, more powerful UAVs can be used for longer delivery distances or heavier packages, while less powerful UAVs can be used for shorter distances or light packages. While the distance between source location 102 and delivery locations 104 is one factor in the cost effectiveness of using UAVS for package delivery, weather is another important factor. A delivery by UAV that may be cost effective over a selected route in sunny weather may be cost ineffective or even not possible by UAV in rainy or snowy weather or in high wind conditions, etc. However, some weather conditions can be managed by appropriate weather-proofing or by changing a configuration of the UAV.

Figure 2:
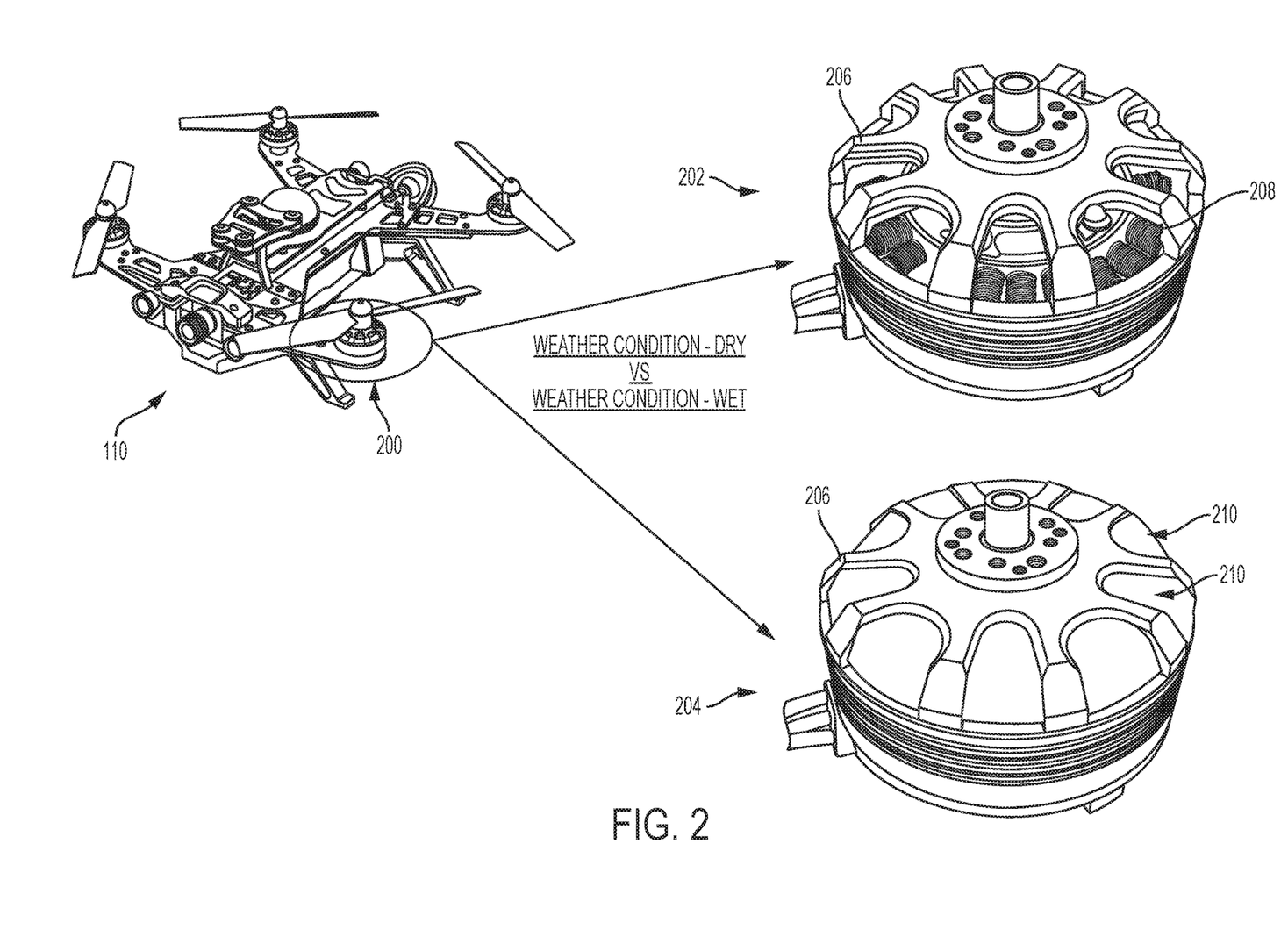
FIG. 2 shows an illustrative unmanned aerial vehicle (UAV) with various modular components that can be interchanged at the UAV.

FIG. 2 shows an illustrative UAV 110 with various modular components that can be interchanged at the UAV 110 in order to provide weather-proofing or to accommodate other conditions that can be encountered by the UAV 110. Illustrative UAV 110 includes four rotor systems, each rotor system being powered by an electric motor, such as electric motor 200. Diagram 202 shows a close-up of the electric motor 200 configured without weather-proofing. Such configuration is useful for sunny weather, etc. The electric motor 200 includes circuitry that is enclosed in a casing 206 that includes various apertures 208 that provide ventilation in order to cool the motor 200. The motor without weather-proofing includes an exposed electric motor, i.e., exposed electromagnetics and exposed circuitry. The lack of weather-proofing makes the UAV 110 lightweight (in comparison to a weather-proofed UAV 110) which allows the UAV 110 to travel further or over longer distances between charging stops. Additionally, having the exposed motor allows for more efficient cooling of the motor, which allows the UAV 110 to travel faster.

Diagram 204 shows a close-up of the electric motor 200 of the UAV configured with weather-proofing, which can be used in rainy or even snowy weather. The weather-proofing includes seals 210 which cover the electric motor to protect from rain, snow, etc. The seals 210 can be polymer caps or coatings that cover the apertures 208 and can be affixed or removed depending on whether weather-proofing is needed at a selected time. By weather-proofing the electric motor 200, the weight of the UAV 110 is increased (in comparison to a UAV with no weather-proofing). Increasing the weight of the UAV 110 decreases the distance that the UAV 110 can travel between charging. Additionally, the presence of seals 210 to close the apertures 208 reduces the amount of air-cooling at the motor 200, which mandates either operation of the UAV 110 at slower or reduced speeds, or the use of additional heatsinks, which further increases weight of the UAV 110. However, the weather-proofed motor prevents damage due to rain, snow or outside elements.

The seals 210 can be placed over the electric motor 200 or removed based on weather conditions. Alternatively, the electric motor 200 is a modulator motor. Thus, a motor that has no weather-proofing can be removed and replaced with a motor that has weather-proofing when weather conditions require weather proofing. When weather conditions improve, the motor that has weather-proofing can be removed and replaced with the motor that has no weather-proofing. Changing the configuration of the UAV can be done either manually or by a machine.

Figure 3:
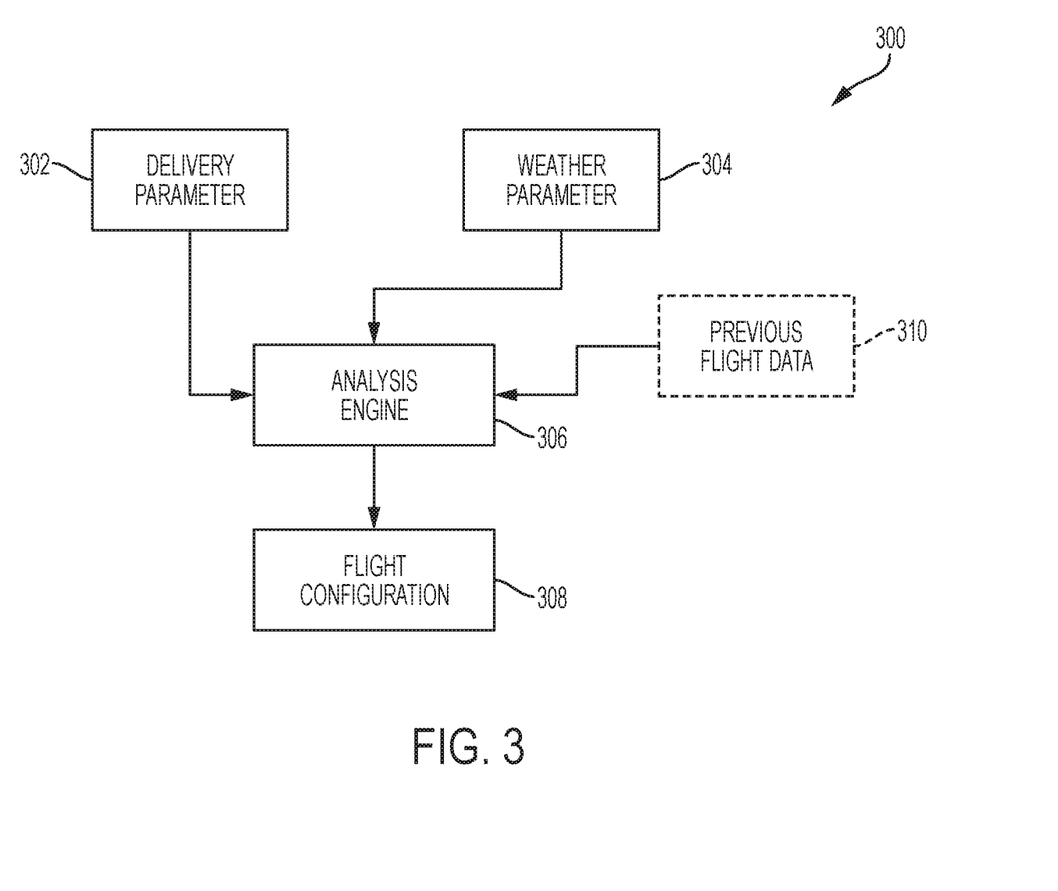
FIG. 3 shows a schematic diagram of a method for determining a flight configuration of a UAV for delivery of a package in an embodiment.

FIG. 3 shows a schematic diagram 300 of a method for determining a flight configuration of a UAV for delivery of a package in an embodiment. The diagram 300 shows an analysis engine 306 that determines or selects a configuration for a UAV based on at least a delivery parameter 302 and a weather parameter 304. The delivery parameter 302 may include parameters such as a delivery area, a delivery timeframe, a package weight, etc. The weather parameter 304 includes parameters such as barometric pressure, humidity, precipitation, wind speed, temperature, weather radar data, etc. In various embodiments, the weather parameter 304 is specific to the delivery area and the delivery timeframe for the package.

The analysis engine 306 performs a cost benefit analysis based on the delivery parameter 302 and the weather parameter 304 in order to determine flight configuration for the UAV 110 that reduces the cost for delivery of the package. In various embodiments, the analysis engine 306 decides upon a flight configuration that reduces an overall cost for the delivery package. In various embodiments, the flight configuration includes a selection of a flight route, a selection of a flight time for delivery of the package, and a configuration of the UAV. Changing a configuration of the UAV may include selecting a particular UAV type, selecting to weather proof a UAV, changing a motor of the UAV, changing a propeller of the UAV, selecting a frequency for recharging the UAV, selecting a number or frequency of deliveries for the UAV, etc. The analysis engine 306 can also make a cost benefit analysis and decision based on historical data, such as previous flight data 310 that has been obtained from a UAV having flown over a selected route in similar weather conditions, etc. The analysis engine 306 can then provide instructions for a flight configuration 308 to an operator or a machine that switches out modular components and assembles the UAV as instructed.

Figure 4:
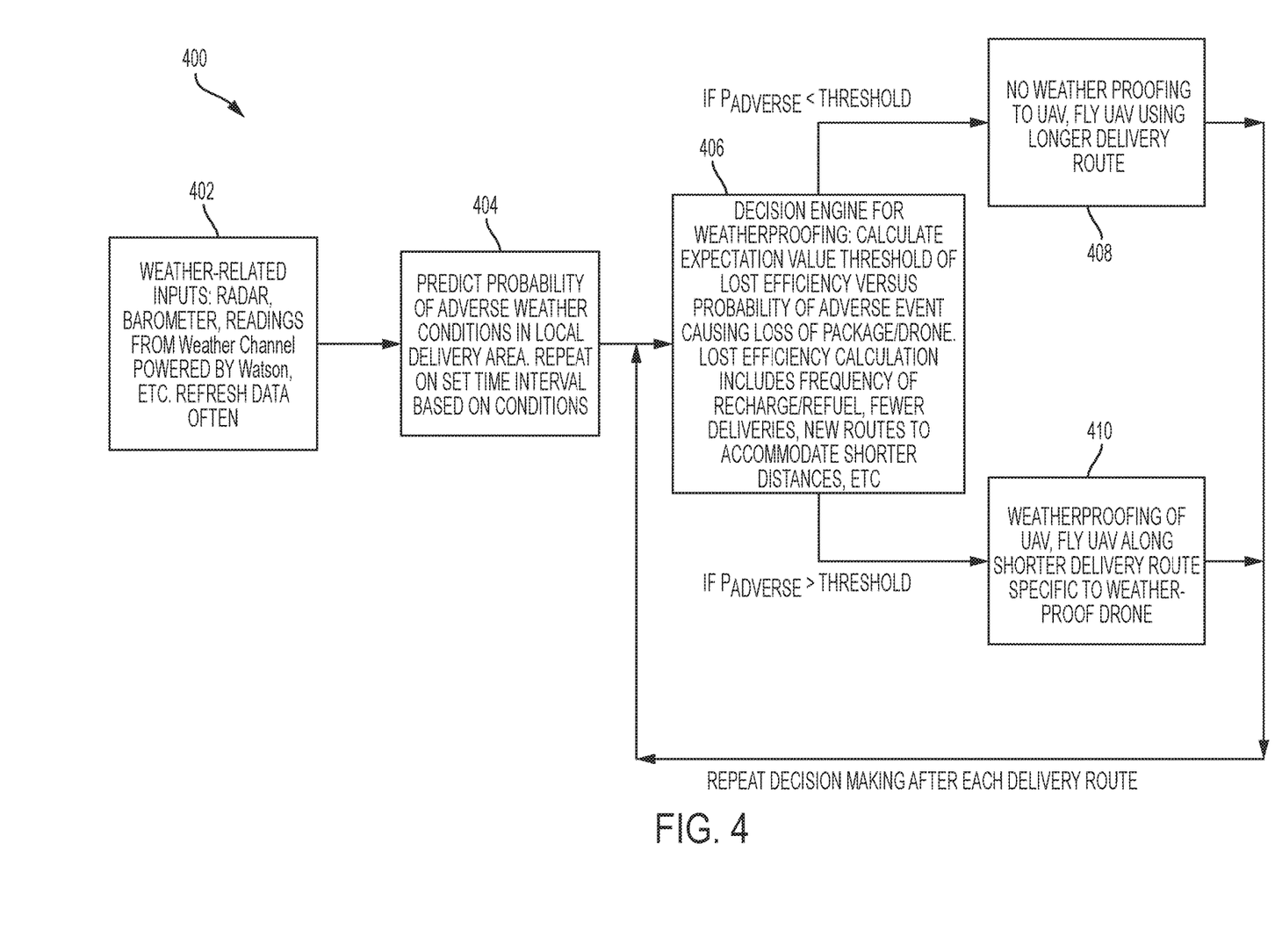
FIG. 4 shows a flowchart illustrating a method for selecting a flight configuration for a UAV in an embodiment.

FIG. 4 shows a flowchart 400 illustrating a method for selecting a flight configuration for a UAV 110 in an embodiment. In box 402, delivery parameters are obtained, such as a delivery area, a delivery time frame, a package weight, etc., for a package delivery in a selected delivery area during a selected delivery time frame. In box 404, a weather parameter or weather data is obtained. The weather data can include, but is not limited to, barometric pressure, weather radar data, temperature data, wind data, humidity, cloud overcast, weather radar data, etc. The weather data can be refreshed on a periodic basis at a frequency that keeps the weather data current, e.g., every 1-5 minutes. A probability map of adverse weather conditions can be predicted for the local delivery area with the selected delivery time frame. This probability map can be updated with each new update of the weather data. For example, a probability of adverse weather may be determined to be a certain probability for the first delivery route taken at a selected delivery time but may be determined to be a different probability for a second delivery route taken at the selected delivery time. Alternatively, there may be one probability of adverse weather for a delivery route taken at a first delivery time, but a different probability for the same delivery route at the second delivery time. Probabilities of adverse weather are thus dependent at least one route selection and delivery time selection. A resolution of the probability map can be determined at a level of resolution of the weather data.

In box 406, a decision is made to select a flight configuration for a UAV in order to deliver the package. The decision can be made by running a cost benefit analysis to determine a cost-efficient flight configuration for delivery of the package for the given delivery parameters and the weather parameters. In various embodiments, the cost benefit analysis determines cost-efficiency for various flight configurations and selects a configuration that is most cost-efficient. In an embodiment, a loss of cost-efficiency due to flying a UAV in a particular weather scenario is compared to an expectation value of lost efficiency due flying the UAV under a particular configuration, i.e., for weather-proofing. The lost efficiency calculation of the efficiency of the UAV includes calculations based on a frequency of recharging or refueling the UAV, a cost resulting from fewer deliveries, a cost for selecting new routes to accommodate shorter distances, etc. The probability of adverse weather events can include a calculated loss in efficiency due to damage or total loss of either the package or of the UAV.

If the expectation of loss due to adverse weather events is less than the threshold of lost efficiency for a particular UAV configuration, the flowchart 400 proceeds to box 408. In box 408, the UAV is flown without any weather proofing and over a flight route that includes more favorable weather conditions. On the other hand, if the expectation of loss due to adverse weather events is greater than the threshold of lost efficiency for a particular UAV configuration, the flowchart 400 proceeds to box 410. In box 410, the UAV is flown with weather proofing and over a flight route that includes the unfavorable weather conditions. Data can be taken by the UAV during a package delivery flight. After the package has been delivered using either the configuration of box 408 or the configuration of box 410, the data is used in the next decision making process when the process returns to box 406.

Various scenarios for a package delivered using the package delivery system discussed herein are now presented. In a first scenario, a delivery from a truck to a package destination can be made difficult by unpredictable small storm system. By making hyper-local, short-term forecasting and using customized weather modeling, it is possible to predict which drones will encounter high winds and rain during a selected delivery time frame. Routes can then be assigned to certain UAVs so that properly equipped UAVs encounter the high winds and rains, while less equipped UAVs are grounded or used in more favorable weather conditions.

In a second scenario, for a warehouse preparing to send out a UAV to deliver a package, a weather pattern between the warehouse and the customer can be determined. The cost of routing the drone around inclement weather can be compared to the cost of equipping the UAV with a modular weather attachment. If the cost of equipping the UAV with weather-proofing attachments is less than the cost of routing the UAV around the inclement weather, then UAV is weather-proofed and sent through the inclement weather. If the cost of routing the UAV around the inclement weather is less than the cost of weather-proofing the UAV, then the UAV is sent along a route around the inclement weather. This decision-making saves logistical costs and delivery time.

Figure 5:
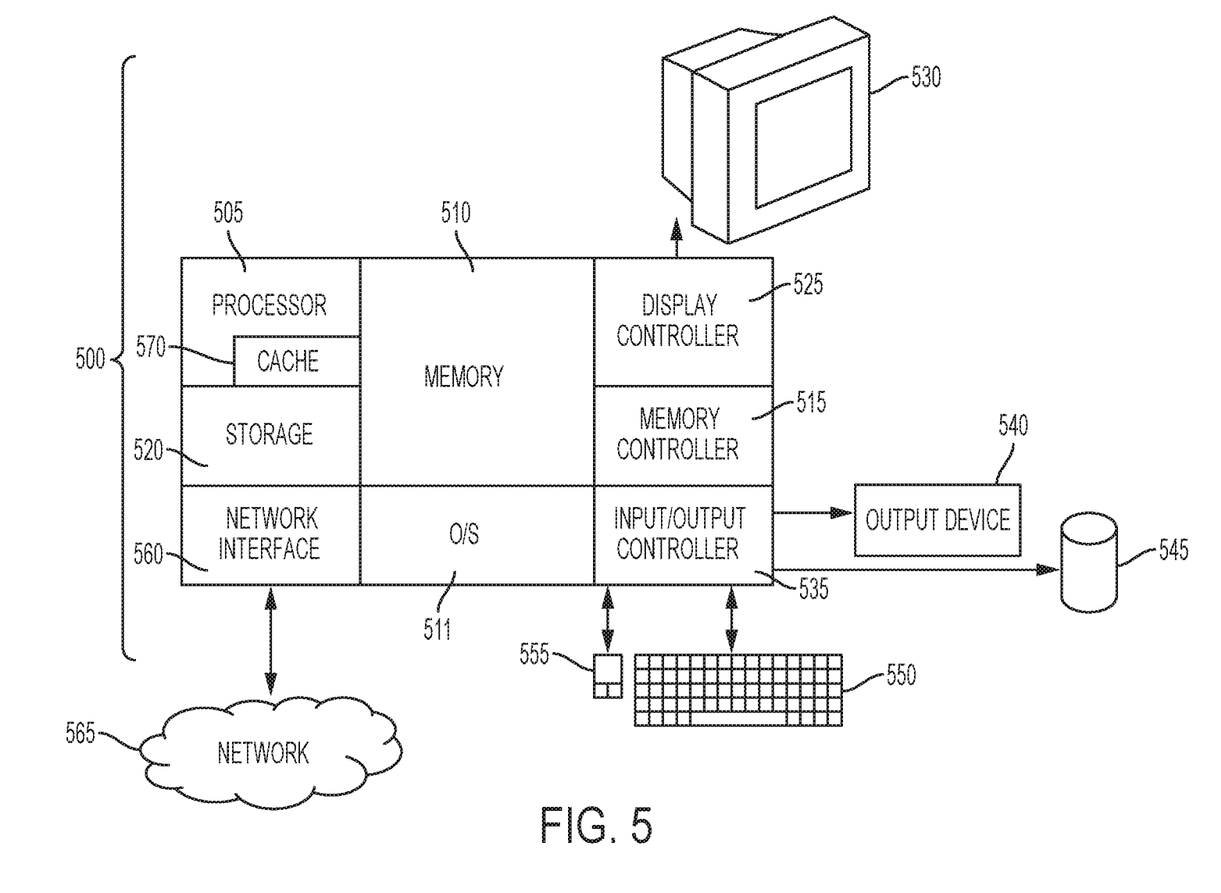
FIG. 5 illustrates a block diagram of a computer system for use in implementing some or all aspects of the system or method according to some embodiments.

FIG. 5 illustrates a block diagram of a computer system 500 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 500, such as a personal computer, workstation, minicomputer, or mainframe computer.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a microprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, or other types of storage media. Note that the memory 510 may have a distributed architecture, where various components are situated remote from one another but may be accessed by the processor 505.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 505 or other retrievable information, may be stored in storage 520, which may be a storage device such as a hard disk drive or solid state drive. The stored instructions in memory 510 or in storage 520 may include those enabling the processor to execute one or more aspects of the systems and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 500, such as that illustrated in FIG. 5.

Technical effects and benefits of some embodiments include reducing the cost of package delivery via UAVs, preventing or reducing damage to packages and or UAVs, improving the flight configuration selection based on previous flight data, saving logistical cost and flight time.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for delivering a package via an unmanned aerial vehicle (UAV), the method comprising:
    obtaining a delivery parameter for delivering the package via the UAV;
    obtaining a weather parameter related to the delivery parameter;
    predicting an efficiency loss for each of a plurality of flight configurations by applying a cost benefit analysis based on the delivery parameter and the weather parameter;
    selecting, via a processor, a flight configuration of the UAV that reduces a delivery cost of the package via the UAV based on the weather parameter and the delivery parameter by comparing the predicted efficiency loss for each of the plurality of flight configurations to an efficiency threshold, wherein the efficiency threshold is based on a cost due to a loss of the package; and
    delivering the package using the selected flight configuration of the UAV,
    wherein the flight configuration comprises a configuration of the UAV in one of a weatherproof configuration and a non-weatherproof configuration,
    wherein the non-weatherproof configuration includes electric motors which are exposed to facilitate air-cooling of the electric motors and wherein the weatherproof configuration includes seals that protect the electric motors from exposure to rain and heatsinks used to cool the electric motors, wherein the seals and heatsinks are not present in the non-weatherproof configuration.

2. The method of claim 1, further comprising selecting the flight configuration based on results of a previous delivery flight of the UAV having a similar route in similar weather.

3. The method of claim 1, wherein the flight configuration further comprises a delivery route and a delivery time.

4. The method of claim 1, wherein operating the UAV in the non-weatherproof configuration increases one or more of a flight speed and a range relative to operating the UAV in the weatherproof configuration.

5. The method of claim 1, wherein a weight of the UAV in the weatherproof configuration is greater that the weight of the UAV in the non-weatherproof configuration.

6. A system for package delivery, the system comprising:
    a memory having computer readable instructions; and
    one or more processors for executing the computer readable instructions, the computer readable instructions comprising instructions for:
        obtaining a delivery parameter for delivering the package via an unmanned aerial vehicle (UAV);
        obtaining a weather parameter related to the delivery parameter;
        predicting an efficiency loss for each of a plurality of flight configurations by applying a cost benefit analysis based on the delivery parameter and the weather parameter;
        selecting, via a processor, a flight configuration of the UAV that reduces a delivery cost of the package via the UAV based on the weather parameter and the delivery parameter by comparing the predicted efficiency loss for each of the plurality of flight configurations to an efficiency threshold, wherein the efficiency threshold is based on a cost due to a loss of the package; and
        delivering the package using the selected flight configuration of the UAV,
        wherein the flight configuration comprises a configuration of the UAV in one of a weatherproof configuration and a non-weatherproof configuration,
        wherein the non-weatherproof configuration includes electric motors which are exposed to facilitate air-cooling of the electric motors and wherein the weatherproof configuration includes seals that protect the electric motors from exposure to rain and heatsinks used to cool the electric motors, wherein the seals and heatsinks are not present in the non-weatherproof configuration.

7. The system of claim 6, the computer readable instructions further comprising instructions for selecting the flight configuration based on results of a previous delivery flight of the UAV having a similar route in similar weather.

8. The system of claim 6, wherein the flight configuration further comprises a delivery route and a delivery time.

9. A computer program product for delivery of a package, the computer program product comprising a computer readable storage medium having program instructions embodied therewith, the program instructions executable by a processor to cause the processor to perform:
    obtaining a delivery parameter for delivering the package via an unmanned aerial vehicle (UAV);
    obtaining a weather parameter related to the delivery parameter; and
    selecting, via a processor, a flight configuration of the UAV that reduces a delivery cost of the package via the UAV based on the weather parameter and the delivery parameter by comparing the predicted efficiency loss for each of the plurality of flight configurations to an efficiency threshold, wherein the efficiency threshold is based on a cost due to a loss of the package,
    wherein the flight configuration comprises a configuration of the UAV in one of a weatherproof configuration and a non-weatherproof configuration,
    wherein the non-weatherproof configuration includes electric motors which are exposed to facilitate air-cooling of the electric motors and wherein the weatherproof configuration includes seals that protect the electric motors from exposure to rain and heatsinks used to cool the electric motors, wherein the seals and heatsinks are not present in the non-weatherproof configuration.

10. The computer program product of claim 9, wherein the program instructions are further executable by the processor to cause the processor to select the flight configuration based on results of a previous delivery flight of the UAV having a similar route in similar weather.

11. The computer program product of claim 9, wherein the flight configuration further comprises a delivery route and a delivery time.

* * * * *